US008985301B2

(12) United States Patent
Werlinger

(10) Patent No.: US 8,985,301 B2
(45) Date of Patent: Mar. 24, 2015

(54) RELOAD CONVEYOR WITH ARTICULATING FRAME

(71) Applicant: Jay Werlinger, Brownsburg, IN (US)

(72) Inventor: Jay Werlinger, Brownsburg, IN (US)

(73) Assignee: Earth Corp. Industries LLC, Lebanon, IN (US)

( * ) Notice: Subject to any disclaimer, the term of this patent is extended or adjusted under 35 U.S.C. 154(b) by 0 days.

(21) Appl. No.: 13/854,194

(22) Filed: Apr. 1, 2013

(65) Prior Publication Data

US 2013/0233682 A1 Sep. 12, 2013

Related U.S. Application Data

(63) Continuation-in-part of application No. 12/921,350, filed as application No. PCT/US2009/036167 on Mar. 5, 2009, now Pat. No. 8,408,377.

(60) Provisional application No. 61/068,205, filed on Mar. 5, 2008.

(51) Int. Cl.
*B65G 21/10* (2006.01)
*B65G 21/12* (2006.01)
*B65G 41/00* (2006.01)

(52) U.S. Cl.
CPC ............. *B65G 21/12* (2013.01); *B65G 21/10* (2013.01); *B65G 41/002* (2013.01)
USPC .......................................... 198/312; 198/313

(58) Field of Classification Search
CPC ........ B65G 21/14; B65G 39/12; B65G 41/00; B65G 41/001; B65G 41/002
USPC .................................................. 198/312, 313
See application file for complete search history.

(56) References Cited

U.S. PATENT DOCUMENTS

| 5,197,845 | A | 3/1993 | Snead |
|---|---|---|---|
| 6,129,196 | A | 10/2000 | Lapper et al. |
| 6,186,338 | B1 * | 2/2001 | Douglas .................. 209/421 |
| 6,302,265 | B1 | 10/2001 | Cunningham |
| 6,447,238 | B1 | 9/2002 | Brown |
| 6,814,532 | B1 | 11/2004 | Thompson et al. |
| 6,843,376 | B2 * | 1/2005 | Dube et al. .................. 209/421 |
| 6,964,551 | B1 | 11/2005 | Friesen |
| 7,267,519 | B2 | 9/2007 | Cresswell et al. |
| 7,273,150 | B2 | 9/2007 | Fridman et al. |
| 8,408,377 | B2 * | 4/2013 | Werlinger ................. 198/313 |
| 8,505,738 | B2 * | 8/2013 | O'Keeffe et al. ........... 209/421 |

OTHER PUBLICATIONS

International Searching Authority, International Search Report, PCT/US09/36167, May 12, 2009.
International Searching Authority, Written Opinion of ISA, PCT/US09/36167, May 12, 2009.

* cited by examiner

*Primary Examiner* — James R Bidwell
(74) *Attorney, Agent, or Firm* — Ice Miller LLP

(57) ABSTRACT

A reload conveyor with an articulating conveyor frame is provided. The reload conveyor includes a main conveyor frame and a placement conveyor frame positioned at a discharge end of the main conveyor frame. The placement conveyor frames articulates to assume a transport configuration and a material transfer configuration. The overall length of the placement conveyor frame in the transport configuration is substantially shorter than in the material transfer configuration. A pair of material receiving mechanisms are provided and arranged to assume a material transfer configuration and a transport configuration.

20 Claims, 4 Drawing Sheets

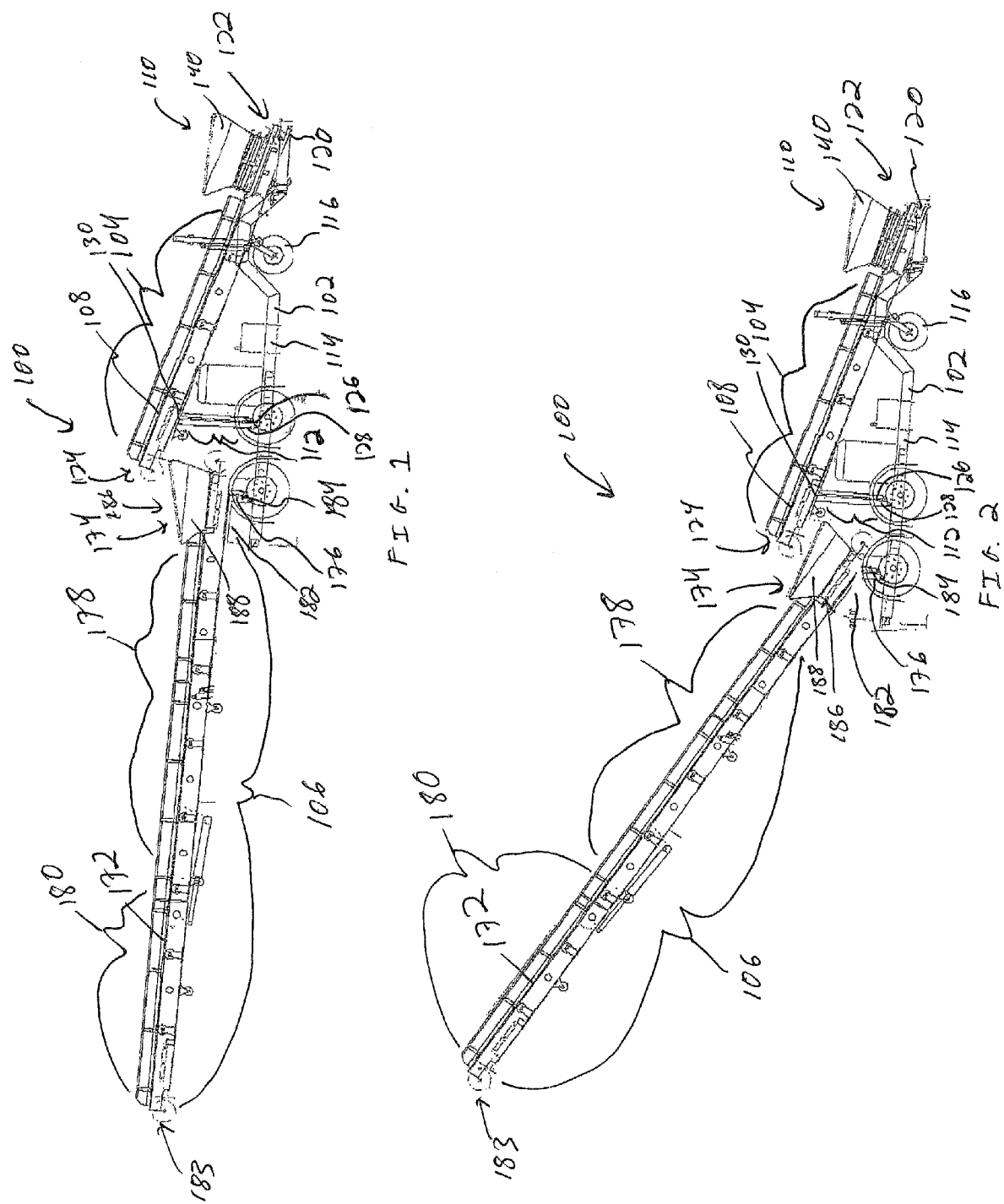

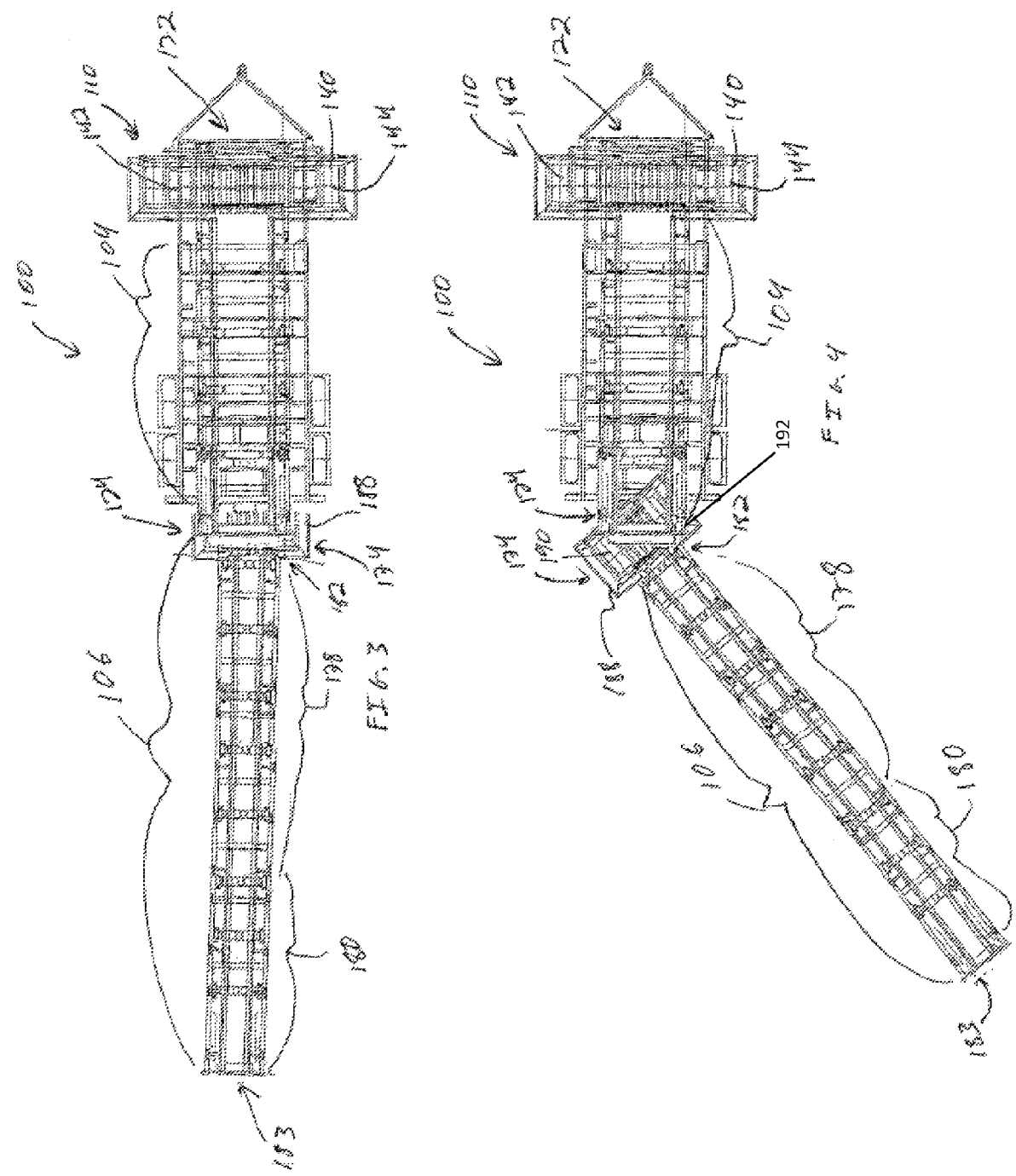

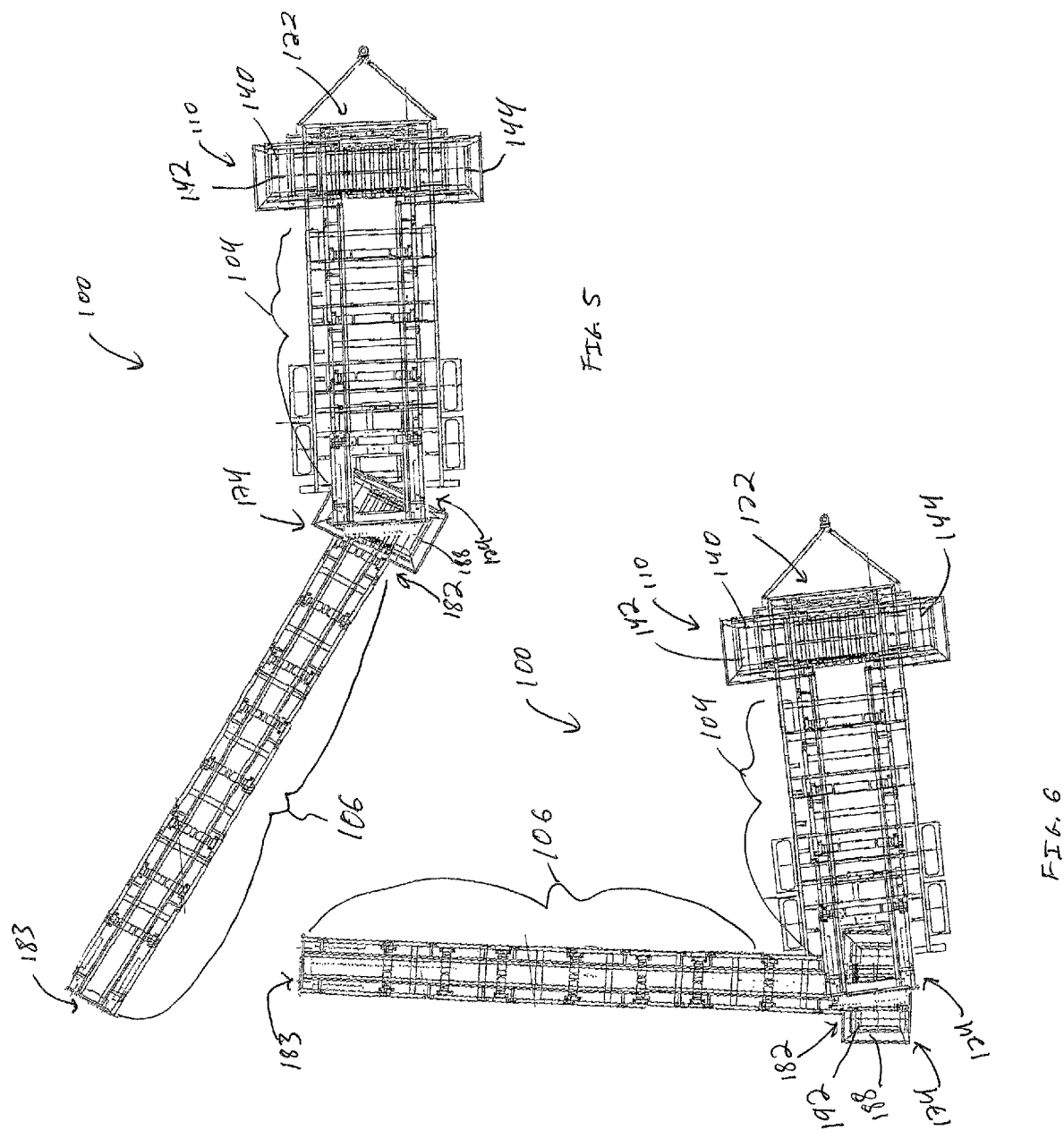

RELOAD CONVEYOR WITH ARTICULATING FRAME

CROSS-REFERENCE TO RELATED APPLICATIONS

The present application is a continuation-in-part of and claims priority to U.S. patent application Ser. No. 12/921,350, now U.S. Pat. No. 8,408,377, filed Sep. 7, 2010 and entitled "RELOAD CONVEYOR WITH ARTICULATING CONVEYOR FRAME", which claims priority to PCT Patent Application No. PCT/US2009/36167 filed Mar. 5, 2009 and entitled "RELOAD CONVEYOR WITH ARTICULATING CONVEYOR FRAME", which claims priority to U.S. Provisional Patent Application No. 61/068,205 filed Mar. 5, 2008 and entitled "RELOAD CONVEYOR WITH ARTICULATING CONVEYOR FRAME" each of which is herein incorporated by reference.

BACKGROUND

Often landscaping companies and construction companies utilize a spreader or slinger truck to spread compost, grass seeds and other bulk materials over a large area. One such application is the utilization of compost or grass seeds along the side of a public thoroughfare following road construction. Such spreaders or slingers allow large quantities of material to be spread rapidly. Unfortunately spreaders and slingers typically have limited capacity for storing the material to be spread. In the road construction example, other trucks or trailers are often used to deliver the bulk material to be spread to the site at which it will be spread while the spreader or slinger remains at the current landscaping site.

Typically the delivery vehicle is not equipped to effectively transfer the material into the hopper or storage section of the spreader or slinger. For example, some spreader/slingers include an open top bed acting as a hopper for holding materials to be spread by a spreader conveyor or hose.

The open top of such spreaders/slingers is too high off of the ground for standard dump trucks of other standard delivery vehicles to transfer their load of material directly into the hopper section of the spreader or slinger. One system for transferring material from a delivery vehicle to the general purpose slinger trucks or to other slingers and spreaders is a reload conveyor. One known reload conveyor is also manufactured by Conveyor Application Systems and is configured to reload the slinger trucks and similar slingers and spreaders having a top opening bed or hopper. Some slingers have their own reload conveyor system attached thereto.

Known existing reload conveyors are typically high capacity conveyors designed to handle a wide range of materials that can be spread by the slinger trucks including, but not limited to compost, mulch, seeds, construction aggregates, asphalt, concrete, sand, top soil, cinder rock and crushed or rounded rock or stone. Such reload conveyors include a rigid straight conveyor bed or frame and a hopper for receipt of the material to be loaded into the slinger or spreader. A conveyor belt is guided by the conveyor bed or frame and transports material from the hopper to a discharge end of the reload conveyor. The rigid conveyor frame may be attached to a trailer providing wheels for transporting the reload conveyor to work sites. The rigid conveyor frame may be mounted in a manner to allow the rigid frame to be rotated about a pivot point adjacent the hopper so that the discharge end of the conveyor may be elevated for transferring material from the hopper into the open bead of the spreader and lowered for transportation of the reload conveyor. When in transport configuration, such reload conveyors are very long.

Often, in order to receive materials from a dump or conveyor bed truck, the hopper of a reload conveyor is sized to exceed the width of the bed of the truck so that during material transfer most of the material leaving the bed of the truck is discharged into the hopper when the truck is properly positioned. Often, trucks used to transport materials are manufactured with beds that approach the width limitation for travel on public thoroughfares without a wide load permit, signage or escort and/or chase vehicles. Thus, a hopper configured to be wider than the bed of such trucks may exceed the limitation for travel on public thoroughfares without a wide load permit, signage or escort and/or chase vehicles.

SUMMARY

In one embodiment, a reload conveyor with an articulating conveyor frame is provided. The reload conveyor includes a main conveyor frame and a placement conveyor frame positioned at a discharge end of the main conveyor frame. The placement conveyor frames articulates to assume a transport configuration and a material transfer configuration. The overall length of the placement conveyor frame in the transport configuration is substantially shorter than in the material transfer configuration. A pair of material receiving mechanisms are provided and arranged to assume a material transfer configuration and a transport configuration.

In another embodiment, a reload conveyor with an articulating conveyor frame is provided. The reload conveyor includes a trailer and a main conveyor frame coupled to the trailer. A placement conveyor frame is positioned at a discharge end of the main conveyor frame. The placement conveyor frame is coupled to and pivots about a pivot axis of the trailer. The placement conveyor frame is configured to articulate to assume a transport configuration and a material transfer configuration, wherein the overall length of the reload conveyor in the transport configuration is substantially shorter than in the material transfer configuration. A pair of material receiving mechanisms is provided. The width of each material receiving mechanism is substantially less in the transport configuration than in the material transfer configuration.

BRIEF DESCRIPTION OF THE DRAWINGS

The embodiments described herein and other features, advantages and disclosures contained herein, and the manner of attaining them, will become apparent and the present disclosure will be better understood by reference to the following description of various exemplary embodiments of the present disclosure taken in conjunction with the accompanying drawing, wherein:

FIG. 1 is a side schematic view of a reload conveyor formed in accordance with an embodiment of the present disclosure.

FIG. 2 is a side schematic view of the reload conveyor shown in FIG. 1 and having the placement conveyor frame extended upward.

FIG. 3 is a top schematic view of the reload conveyor shown in FIG. 1.

FIG. 4 is a top schematic view of the reload conveyor shown in FIG. 3 and having the placement conveyor frame angled to a side.

FIG. 5 is a top schematic view of the reload conveyor shown in FIG. 3 and having the placement conveyor frame angled to a side.

FIG. 6 is a top schematic view of the reload conveyor shown in FIG. 3 and having the placement conveyor frame angled to a side.

DETAILED DESCRIPTION

Figure 7:
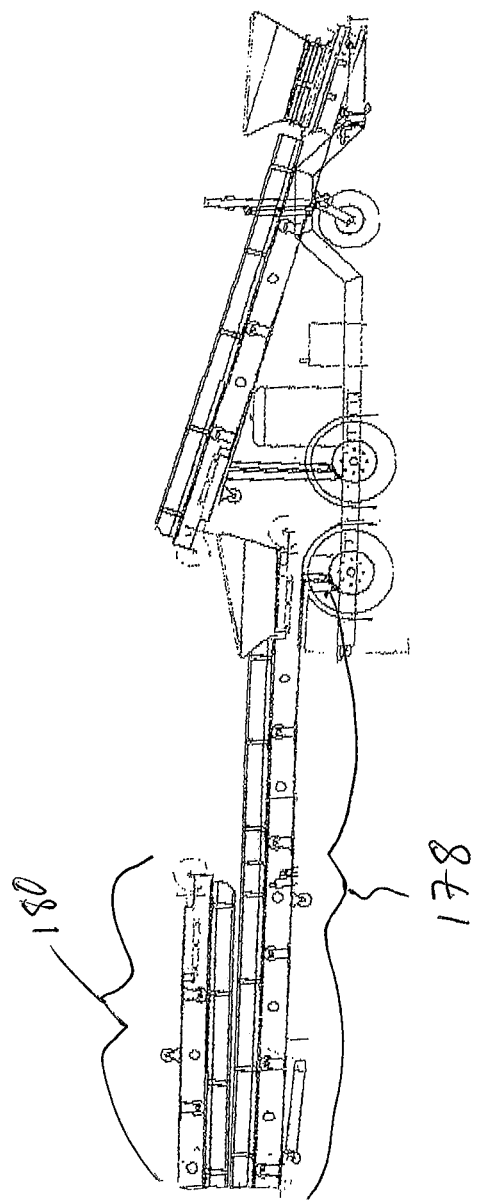
FIG. 7 is a side schematic view of the reload conveyor shown in FIG. 1 and in a transport configuration.

The features and advantages of this disclosure, and the manner of attaining them, will be more apparent and better understood by reference to the following descriptions of the disclosed methods and systems, taken in conjunction with the accompanying drawings. The components in the figures are not necessarily to scale, emphasis instead being placed upon illustrating the principles of the disclosure. Moreover, in the figures like referenced numerals designate corresponding parts throughout the different views, but not all reference numerals are shown in each of the figures.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

As shown, for example, in FIGS. 1-7, a reload conveyor 100 with an articulating conveyor frame includes a trailer 102, a main conveyor frame 104, and a placement conveyor frame 106. In one embodiment, the main conveyor frame 104 has a length of approximately fifteen feet. The main conveyor frame 104 includes a main conveyor belt 108, a main material-receiving device 110, and frame pivoting mechanisms 112. The trailer 102 includes a frame 114 having a plurality of wheels 116. A tow hitch assembly (not shown) may be coupled to the frame 114 for coupling the reload conveyor 100 to a transport vehicle (not shown) for transportation to and from a work site.

The main conveyor frame 104 is coupled to the trailer 102 to pivot about a pivot axis 120 adjacent a load end 122 so that a discharge end 124 of the conveyor can be raised and lowered as the conveyor frame 104 pivots about the axis 120. The illustrated embodiment of the main conveyor frame 104 includes a frame pivoting mechanism 112 comprising a pair of elevation cylinders 126 coupled to a pair of telescoping supports 128. Each cylinder 126 extends between, and is pivotally coupled at opposite ends to, the trailer frame 114 and a pivot axis 130. The top end of the telescoping support 128 is pivotally coupled to the main conveyor frame 104 at pivot axis 130 and the bottom of the telescoping support 128 is pivotally coupled to the frame 114 of the trailer 102. These cylinders 126 when extended raise, and when retracted lower, the height of the pivot axis 130 and consequently the discharge end 124 of the main conveyor frame 104.

Extension and retraction of the cylinders 126 induce the main conveyor frame 104 to pivot about pivot axis 120. These cylinders 126 are extended and retracted to aid in transforming the main conveyor frame 104 between a transport configuration, wherein the main conveyor frame 104 is in a lowered position, and a material transfer configuration, wherein the main conveyor frame 104 is in a raised position. The cylinders 126 are also extended to raise the height of the discharge end of the main conveyor frame 104.

A main material receiving device 110 positioned on the main conveyor frame 104 includes a hopper 140 and a pair of lateral conveyors 142, 144. The hopper 140 is configured with a bottom opening and sloped side walls which urges material dumped therein either onto the lateral conveyors 142, 144 or directly onto the main conveyor belt 108. The hopper walls include a first set of walls coupled to the sliding frame of the first lateral conveyor 142, a second set of walls coupled to the sliding frame of the second lateral conveyor 144, and a third load end wall rigidly mounted to the load end of the conveyor 100. The sliding frames are slidably mounted via members rigidly secured to the main conveyor frame 104 between a transport configuration and a material transfer configuration.

In the material transfer configuration, the distance between opposite ends of lateral conveyors 142, 144 is at maximum. In one embodiment, the distance is preferably at least as wide as the widest dumping mechanism that will be delivering materials to the work site. In the transport configuration, the distance between opposite ends of lateral conveyors 142, 144 is at a minimum, the adjacent end may be touching. In one embodiment, the distance is equal to or less than the maximum width for a towed vehicle without the need to acquire permits, signage and or lead or chase vehicles. In one specific embodiment the distance is less than eight feet six inches. The width of the main material receiving device 110 is substantially less in the transport configuration than in the material transfer configuration.

In one embodiment, the placement conveyor frame 106 has a length of approximately twenty feet in the material transfer configuration. The placement conveyor frame 106 includes a placement conveyor belt 172, a placement material-receiving device 174, and frame pivoting mechanisms 176. The placement conveyor frame 106 includes a load end component 178 that is hingedly coupled to a discharge end component 180. A load end 182 of the load end component 178 is positioned below the discharge end 124 of the main conveyor frame 104 to receive materials from the main conveyor frame 104. The placement conveyor frame 106 is coupled to the trailer 102 to pivot about a pivot axis 184 adjacent a load end 182 of the load end component 178 so that a discharge end 183 of the discharge end component 180 can be raised and lowered as the placement conveyor frame 106 pivots about the axis 184. Additionally, the placement conveyor frame 106 may be rotated side to side within a range of approximately 190° as illustrated in FIGS. 3-6.

A placement material-receiving device 186 positioned on the placement conveyor frame 106 includes a hopper 188 and a pair of lateral conveyors 190, 192. The placement material-receiving device 186 is positioned below the discharge end 124 of the main conveyor frame 104 to receive materials from the main conveyor frame 104. The hopper 188 is configured with a bottom opening and sloped side walls which urges material dumped therein either onto the lateral conveyors 190, 192 or directly onto the placement conveyor belt 172. The hopper walls include a first set of walls coupled to the sliding frame of the first lateral conveyor 190, a second set of walls coupled to the sliding frame of the second lateral conveyor 192, and a third load end wall rigidly mounted to the load end of the placement conveyor frame 106. The sliding frames are slidably mounted via members rigidly secured to the placement conveyor frame 106 between a transport configuration and a transfer configuration.

In the transfer configuration, the distance between opposite ends of lateral conveyors 190, 192 is at maximum. In one embodiment, the distance is preferably at least as wide as the widest dumping mechanism that will be delivering materials to the work site. In the transport configuration, the distance between opposite ends of lateral conveyors 190, 192 is at a minimum, the adjacent end may be touching. In one embodiment, the distance is equal to or less than the maximum width for a towed vehicle without the need to acquire permits, signage and or lead or chase vehicles. In one specific embodiment the distance is less than eight feet six inches. The width of the placement material-receiving device 186 is substantially less in the transport configuration than in the material transfer configuration.

The placement conveyor includes a 190° side to side swing at variable discharge heights for maximum stockpiling or flexibility in reloading trucks and back filling retaining walls or the like. The placement conveyor would be capable of throwing the material off the end approximately 50 plus feet or slowed down to just dropping it off the end.

The placement conveyor frame 106 is configured to assume a transport configuration, as shown, for example, in FIG. 7, and a material transfer configuration, as shown, for example, in FIGS. 1-6. In the material transfer configuration, the discharge end component 180 and the load end component 178 are generally aligned to form a generally straight placement conveyor frame 106. While generally straight, it is within the scope of the disclosure for the discharge end component 180 to form an obtuse angle with the load end component. In the transport configuration, the discharge end component 180 forms a non-straight angle with the load end component 178. In one configuration, the discharge end component 180 forms an acute angle with the load end component 178 when the placement conveyor frame 106 is in the transport configuration. In one embodiment, the discharge end component 180 is positioned on top of the load end component 178 in the transport configuration. The overall length of the placement conveyor frame 106 in the transport configuration is substantially shorter than in the material transfer configuration.

When the reload conveyor 100 is in the transport configuration it exhibits an overall height that is less than thirteen feet six inches to avoid having to obtain special permits, signage or lead and/or chase vehicles when the conveyor 100 is being transported on public highways. Preferably, the overall length of the reload conveyor 100 in the transport configuration is less than or equal to the legal maximum length for an object to be towed without obtaining special permits or signage, or without providing lead and/or chase vehicles during transport. In one specific embodiment, the overall length is less than or equal to forty feet.

While this disclosure has been described as having a preferred design, the systems and methods according to the present disclosure can be further modified within the scope and spirit of this disclosure. This application is therefore intended to cover any variations, uses, or adaptations of the disclosure using its general principles. For example, the methods disclosed herein and in the appended claims represent one possible sequence of performing the steps thereof. A practitioner may determine in a particular implementation that a plurality of steps of one or more of the disclosed methods may be combinable, or that a different sequence of steps may be employed to accomplish the same results. Each such implementation falls within the scope of the present disclosure as disclosed herein and in the appended claims. Furthermore, this application is intended to cover such departures from the present disclosure as come within known or customary practice in the art to which this disclosure pertains and which fall within the limits of the appended claims.

What is claimed is:

1. A reload conveyor with an articulating conveyor frame, the reload conveyor comprising:
    a main conveyor frame;
    a placement conveyor frame positioned at a discharge end of the main conveyor frame and articulating to assume a transport configuration and a material transfer configuration wherein the overall length of the placement conveyor frame in the transport configuration is substantially shorter than in the material transfer configuration; and
    a pair of material receiving mechanisms slidably moveable to assume a material transfer configuration and a transport configuration.

2. The reload conveyor of claim 1, wherein the width of each material receiving mechanism is substantially less in the transport configuration than in the material transfer configuration.

3. The reload conveyor of claim 1, wherein one of the pair of material receiving mechanisms is positioned on the main conveyor frame and the other of the material receiving mechanisms is positioned on the placement conveyor frame.

4. The reload conveyor of claim 1 further comprising a trailer, the placement conveyor frame mounted to the trailer to pivot about a pivot axis.

5. The reload conveyor of claim 4 further comprising a placement conveyer pivoting mechanism mounted to the placement conveyor frame to induce pivoting of the placement conveyor frame about the pivot axis.

6. The reload conveyor of claim 4, wherein the placement conveyor frame pivots up and down.

7. The reload conveyor of claim 1, wherein the placement conveyor frame includes a load end component and a discharge end component.

8. The reload conveyor of claim 6, wherein the discharge end component and the load end component extend in a line in the material transfer configuration.

9. The reload conveyor of claim 6, wherein the discharge end component is positioned at an acute angle with respect to the load end component in the transport configuration.

10. The reload conveyor of claim 6, wherein the discharge end component is positioned on top of the load end component in the transport configuration.

11. A reload conveyor with an articulating conveyor frame comprising:
    a trailer;
    a main conveyor frame coupled to the trailer;
    a placement conveyor frame positioned at a discharge end of the main conveyor frame, the placement conveyor frame coupled to and pivoting about a pivot axis of the trailer; and
    a pair of material receiving mechanisms,
    wherein the placement conveyor frame is articulates to assume a transport configuration and a material transfer configuration, wherein the overall length of the reload conveyor in the transport configuration is substantially shorter than in the material transfer configuration, and wherein the width of each material receiving mechanism is substantially less in the transport configuration than in the material transfer configuration.

12. The reload conveyor of claim 11, wherein one of the pair of material receiving mechanisms is positioned on the main conveyor frame and the other of the material receiving mechanisms is positioned on the placement conveyor frame.

13. The reload conveyor of claim 11 further comprising a placement conveyer pivoting mechanism mounted to the placement conveyor frame to induce pivoting of the placement conveyor frame about the pivot axis.

14. The reload conveyor of claim 11, wherein the placement conveyor frame pivots side to side within a range of 190°.

15. The reload conveyor of claim 11, wherein the placement conveyor frame pivots up and down.

16. The reload conveyor of claim 11, wherein the placement conveyor frame includes a load end component and a discharge end component.

17. The reload conveyor of claim 16, wherein the discharge end component and the load end component extend in a line in the material transfer configuration.

18. The reload conveyor of claim 16, wherein the discharge end component is positioned at an acute angle with respect to the load end component in the transport configuration.

19. The reload conveyor of claim 16, wherein the discharge end component is positioned on top of the load end component in the transport configuration.

20. A reload conveyor with an articulating conveyor frame, the reload conveyor comprising:
- a main conveyor frame;
- a placement conveyor frame positioned at a discharge end of the main conveyor frame and articulating to assume a transport configuration and a material transfer configuration wherein the overall length of the placement conveyor frame in the transport configuration is substantially shorter than in the material transfer configuration, wherein the placement conveyor frame pivots side to side within a range of 190°; and
- a pair of material receiving mechanisms configured and arranged to assume a material transfer configuration and a transport configuration.

* * * * *